(12) United States Patent
Bourque

(10) Patent No.: US 7,958,705 B1
(45) Date of Patent: Jun. 14, 2011

(54) WATERBORNE VEGETATION HARVESTING APPARATUS

(76) Inventor: John R. Bourque, Elm Grove, LA (US)

(*) Notice: Subject to any disclaimer, the term of this patent is extended or adjusted under 35 U.S.C. 154(b) by 53 days.

(21) Appl. No.: 12/454,624

(22) Filed: May 20, 2009

Related U.S. Application Data (60) Provisional application No. 61/128,261, filed on May 20, 2008.

(51) Int. Cl.
*A01D 44/00* (2006.01)

(52) U.S. Cl. .................................... 56/8; 56/9

(58) Field of Classification Search ............. 56/8, 9, 56/11.9
See application file for complete search history.

(56) References Cited

U.S. PATENT DOCUMENTS

| 1,222,324 | A | * | 4/1917 | Richardson | 56/9 |
| 1,795,003 | A | * | 3/1931 | Allen | 56/9 |
| 3,347,029 | A | * | 10/1967 | Grinwald | 56/9 |
| 3,546,858 | A | * | 12/1970 | Chaplin | 56/9 |
| 3,626,675 | A | * | 12/1971 | Chaplin | 56/299 |
| 3,653,192 | A | | 4/1972 | Bryant | 56/1 |
| 3,688,478 | A | | 9/1972 | Bryant | 56/1 |
| 4,258,534 | A | | 3/1981 | Bryant | 56/9 |
| 5,404,696 | A | * | 4/1995 | Vasby | 56/9 |
| 5,775,073 | A | | 7/1998 | Kelpin et al. | 56/8 |

* cited by examiner

*Primary Examiner* — Alicia M Torres
(74) *Attorney, Agent, or Firm* — R. Keith Harrison

(57) ABSTRACT

A waterborne vegetation harvesting apparatus includes a watercraft, a conveyor assembly having a conveyor belt carried by the watercraft and at least one vegetation shredder disposed in communication with the conveyor assembly.

16 Claims, 11 Drawing Sheets

WATERBORNE VEGETATION HARVESTING APPARATUS

CROSS-REFERENCE TO RELATED APPLICATIONS

This application claims the benefit of and incorporates by reference in its entirety U.S. provisional application No. 61/128,261, filed May 20, 2008 and entitled "Waterborne Vegetation Harvesting Apparatus".

FIELD

The present disclosure relates to apparatus for removing waterborne vegetation from a water body. More particularly, the present disclosure relates to a waterborne vegetation harvesting apparatus which floats on a body of water and removes vegetation from the water body.

BACKGROUND

In lakes, ponds, rivers and streams, both native and non-native waterborne vegetation may exist. Non-native waterborne vegetation may be a nuisance and can potentially threaten the diversity or abundance of native species, damage the ecological stability of a body of water and jeopardize commercial, agricultural, aquacultural and recreational activity on the water body. Because the non-native vegetation may rapidly reproduce in a habitat in which there are no impediments to their reproduction (such as predators, parasites and pathogens), the non-native vegetation can crowd out native species; alter habitats; change predator/prey relationships; transmit foreign disease or parasites; disrupt the food chain; clog water intakes; and enhance weed growth.

Therefore, a waterborne vegetation harvesting apparatus is needed which is suitable for harvesting and eliminating undesired waterborne vegetation from a body of water.

SUMMARY

The present disclosure is generally directed to a waterborne vegetation harvesting apparatus. An illustrative embodiment of the waterborne vegetation harvesting apparatus includes a watercraft, a conveyor assembly having a conveyor belt carried by the watercraft and at least one vegetation shredder disposed in communication with the conveyor assembly.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure which is defined by the claims. Furthermore, there is no intention to be bound by any expressed or implied theory presented in the preceding technical field, background, brief summary or the following detailed description.

Figure 1:
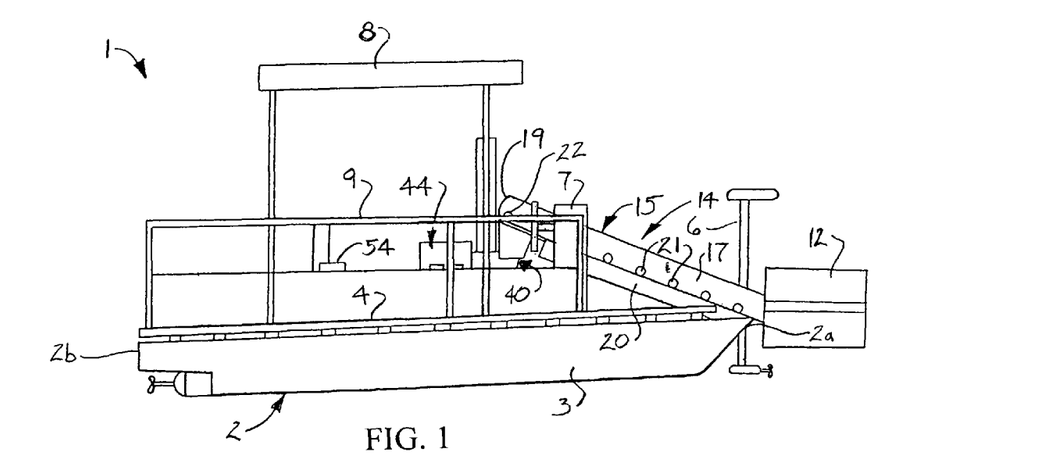
FIG. 1 is a side view of an illustrative embodiment of the waterborne vegetation harvesting apparatus.
Figure 2:
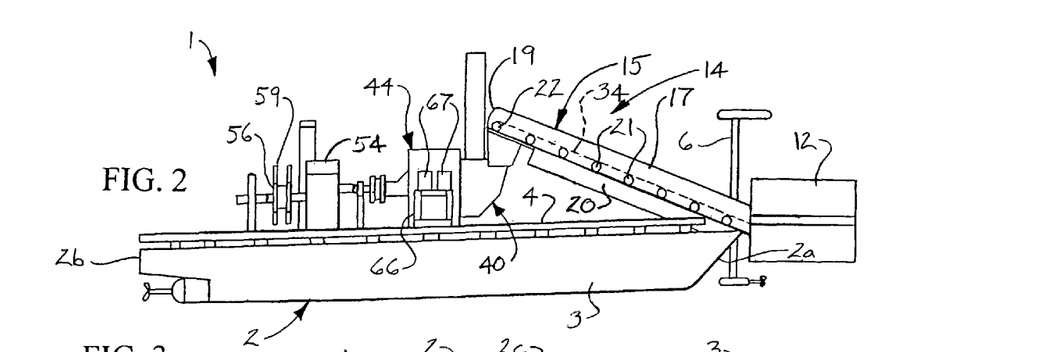
FIG. 2 is a side view of an illustrative embodiment of the waterborne vegetation harvesting apparatus with a canopy, siderail and control console removed from the apparatus for clarity.
Figure 3:
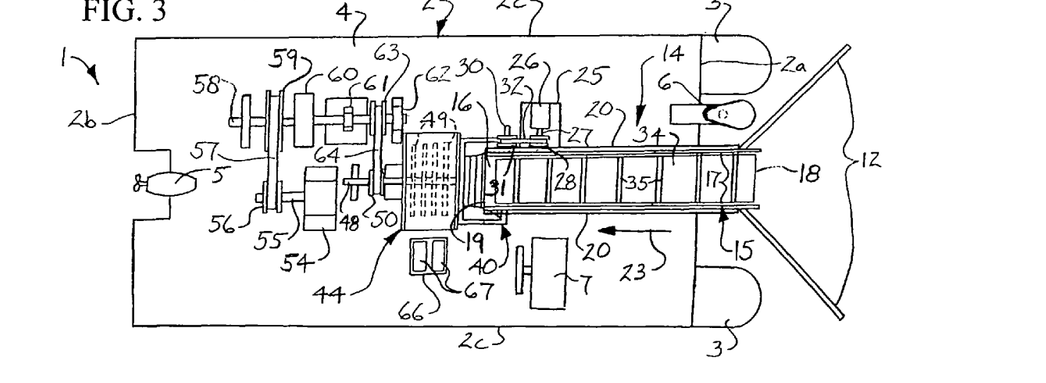
FIG. 3 is a top view of an illustrative embodiment of the waterborne vegetation harvesting apparatus, with the canopy and siderail removed from the apparatus for clarity.
Figure 8:
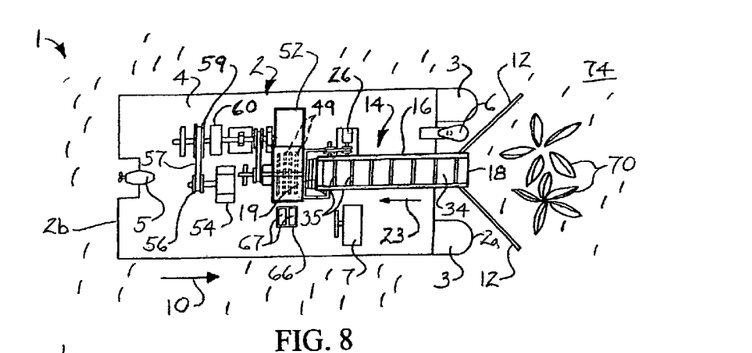
FIGS. 8-10 are top views, respectively, of the waterborne vegetation harvesting apparatus, more particularly illustrating harvesting of waterborne vegetation by operation of the apparatus.
Figure 9:
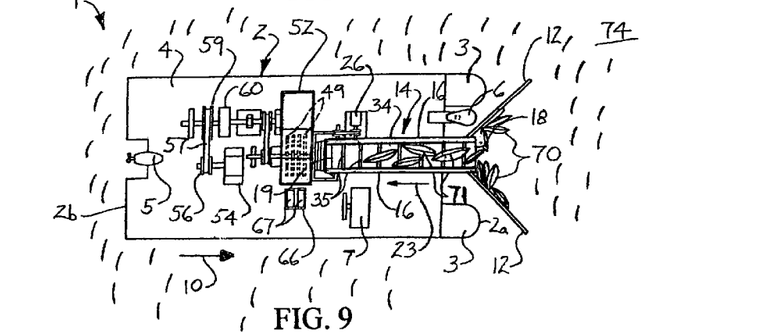
Figure 10:
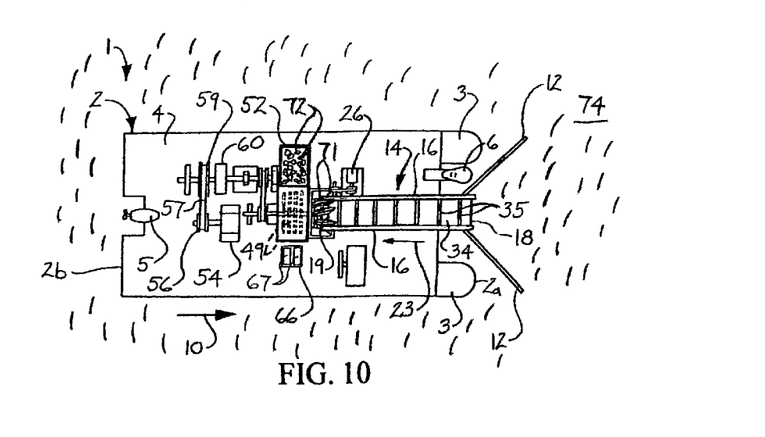

Referring initially to FIGS. 1-7 of the drawings, an illustrative embodiment of the waterborne vegetation harvesting apparatus, hereinafter apparatus, is generally indicated by reference numeral 1. As illustrated in FIGS. 1-3, the apparatus 1 includes a watercraft 2 which may have a generally elongated, rectangular shape, as illustrated in FIGS. 1-3, with a front end 2a; a rear end 2b; and side edges 2c (FIG. 3), or the watercraft 2 may have any suitable alternative shape. The watercraft 2 may include at least two generally elongated, parallel, spaced-apart and buoyant flotation tanks 3. A watercraft platform 4 is provided on the flotation tanks 3. At least one watercraft motor 5 (FIG. 3) is provided on the rear end 2b of the watercraft 2 to propel the watercraft 2 on a body of water 74 (FIGS. 8-10). A trolling motor 6 may be provided at the front end 2a of the watercraft 2. A control console 7 (FIGS. 1 and 3) may be provided on the watercraft platform 4 to facilitate the steering and movement functions of the watercraft 2. As illustrated in FIG. 1, in some embodiments, a canopy 8 may extend over at least a portion of the watercraft platform 4. Guard rails 9 (FIG. 1) may extend upwardly from the watercraft platform 4 along the respective side edges 2c of the watercraft 2. It is to be understood that the foregoing description of the watercraft 2 is illustrative only and that alternative designs of the watercraft 2 are possible.

A conveyor assembly 14, having a loading end 18 and a discharge end 19, as illustrated in FIG. 3, is provided on the watercraft 2 of the apparatus 1. In some embodiments, the loading end 18 of the conveyor assembly 14 may extend beyond the front end 2a of the watercraft 2. In other embodiments, the loading end 18 of the conveyor assembly 14 may extend beyond the rear end 2b or one of the side edges 2c of the watercraft 2. The conveyor assembly 14 may include a generally elongated conveyor assembly frame 15 having a generally elongated, rectangular frame panel 16 and a pair of spaced-apart frame sidewalls 17 which extend from respective edges of and in generally perpendicular relationship with respect to the frame panel 16. In some embodiments, the conveyor assembly frame 15 may be oriented in generally parallel relationship with respect to a longitudinal axis of the watercraft 2. As illustrated in FIGS. 1 and 2, the longitudinal axis of the conveyor assembly frame 15 is disposed in generally sloped relationship with respect to the plane of the watercraft platform 4. The conveyor assembly frame 15 generally slopes downwardly toward the front end 2a of the watercraft 2.

Multiple, spaced-apart idle rollers 21 extend between the frame sidewalls 17 of the conveyor assembly frame 15. A drive roller 22 extends between the frame sidewalls 17 at the discharge end 19 of the conveyor assembly 14. In some embodiments, a pair of roller support frames 20 may be provided on the respective frame sidewalls 17 of the conveyor assembly frame 15. The idle rollers 21 and the drive roller 22 may be mounted on the roller support frames 20. An endless conveyor belt 34 traverses the idle rollers 21 and the drive roller 22. In some embodiments, multiple carrier panels 35 (FIGS. 3, 6 and 7) may extend outwardly from the conveyor belt 34 at spaced-apart intervals with respect to each other.

Figure 6:
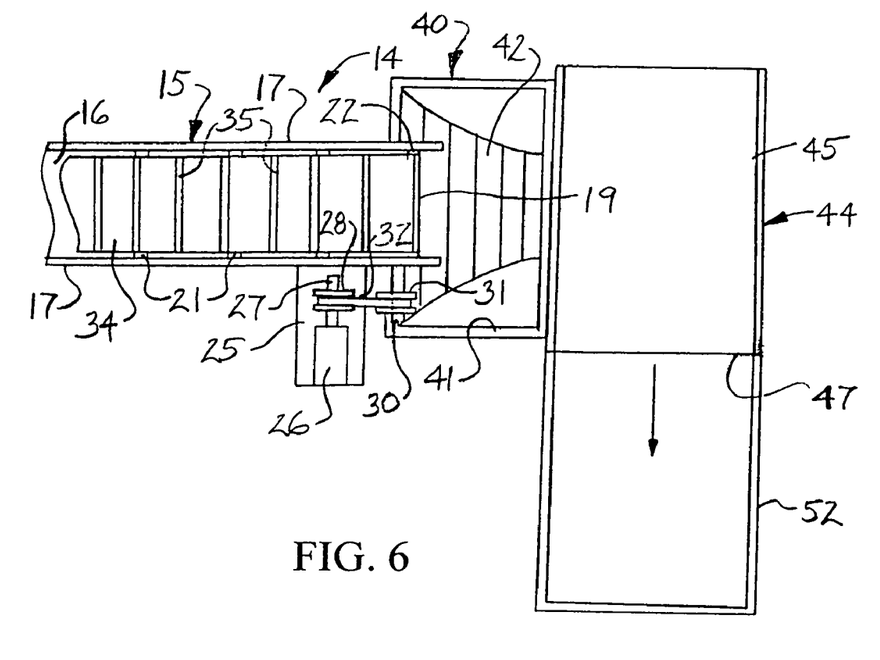
FIG. 6 is a top view of the conveyor assembly (partially in section), the hopper and the vegetation shredder, with a shredded vegetation receiving container positioned at a discharge side of the vegetation shredder.
Figure 7:
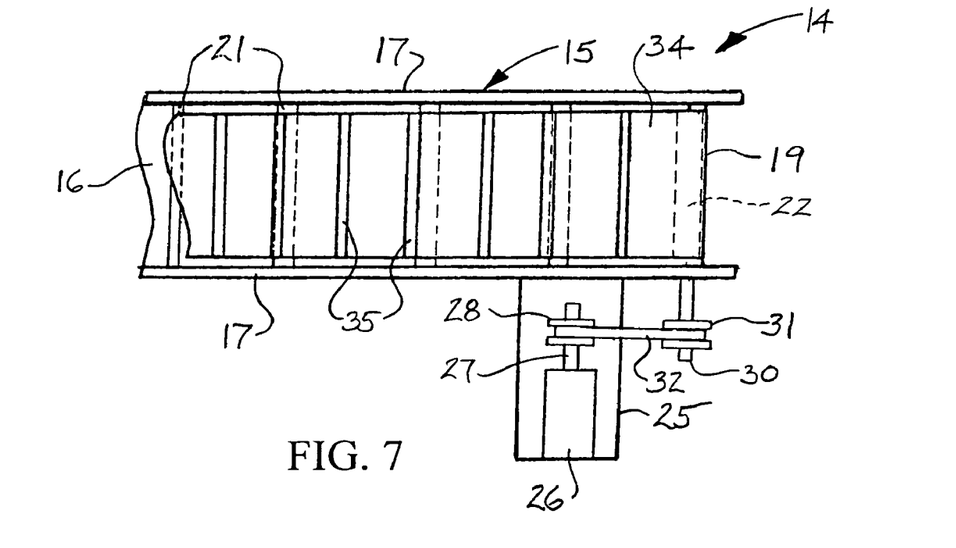
FIG. 7 is a top view of the conveyor assembly (illustrated in phantom), with a conveyor belt motor operably engaging a drive roller of the conveyor assembly.

As illustrated in FIGS. 3, 6 and 7, a conveyor belt motor 26 drivingly engages the drive roller 22. The conveyor belt motor 26 may be mounted on a conveyor belt motor support 25 which extends from one of the frame sidewalls 17 of the conveyor assembly frame 15. In some embodiments, a conveyor belt motor shaft 27 is drivingly engaged by the conveyor belt motor 26. A conveyor belt motor pulley 28 is provided on the conveyor belt motor shaft 27. A conveyor drive shaft 30 drivingly engages the drive roller 22. A conveyor drive pulley 31 is provided on the conveyor drive shaft 30. A conveyor drive belt 32 is trained around the conveyor belt motor pulley 28 and the conveyor drive pulley 31. Accordingly, by operation of the conveyor belt motor 26, rotation is transmitted to the drive roller 22 through the conveyor belt motor shaft 27; the conveyor belt motor pulley 28; the conveyor drive belt 32; the conveyor drive pulley 31; and the conveyor drive shaft 30. The drive roller 22 drives the conveyor belt 34 on the idle rollers 21 in the direction indicated by the arrow 23 in FIG. 3. The conveyor belt motor shaft 27 of the conveyor belt motor 26 may directly or indirectly drivingly engage the drive roller 22 through any suitable alternative mechanical coupling arrangement.

As illustrated in FIGS. 1-3, a pair of diverging vegetation directing panels 12 is provided at the front end 2a of the watercraft 2. When viewed from above, the vegetation directing panels 12 may form a generally V-shaped configuration as illustrated in FIG. 3. In some embodiments, the vegetation directing panels 12 may be welded and/or otherwise attached to the respective frame sidewalls 17 of the conveyor assembly frame 15. However, the vegetation directing panels 12 may be attached to some other element or elements of the watercraft 2 using welding, fasteners and/or any other suitable attachment technique known by those skilled in the art.

Figure 4:
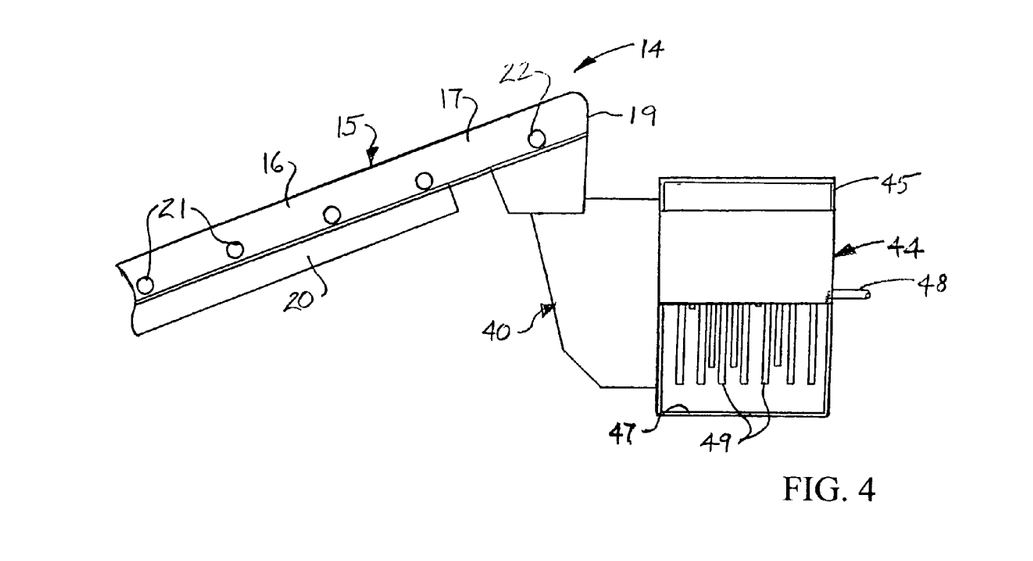
FIG. 4 is a side view of a conveyor assembly (partially in section), a hopper and a vegetation shredder of the apparatus.
Figure 5:
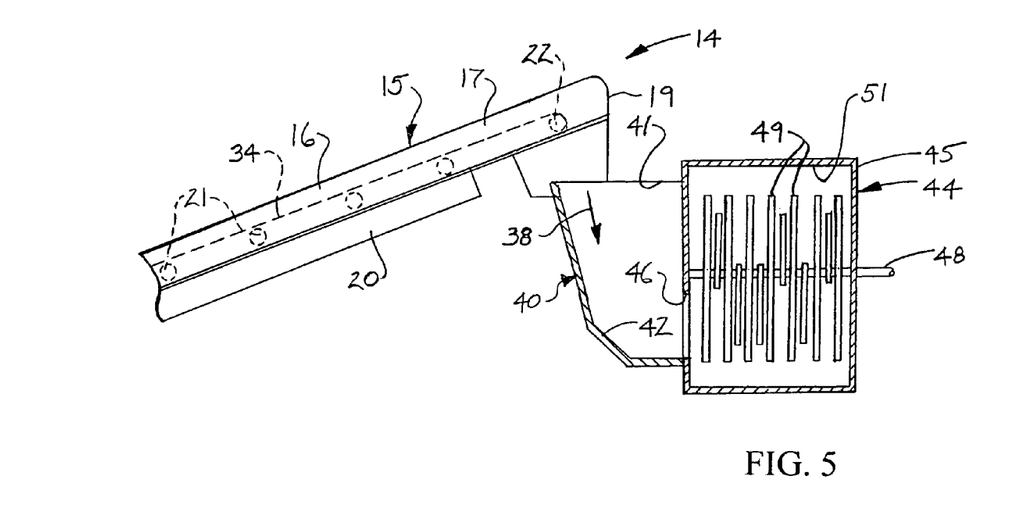
FIG. 5 is a sectional view of the hopper and vegetation shredder of the apparatus, with the discharge end of the conveyor assembly positioned over the hopper.

A hopper 40 is provided on the watercraft platform 4 of the watercraft 2 and is disposed generally beneath the discharge end 19 of the conveyor assembly 14. As illustrated in FIG. 5, the hopper 40 has a hopper interior 41. A generally sloped guide surface 42 is disposed in the hopper interior 41 of the hopper 40. A vegetation shredder 44 is disposed adjacent to the hopper 40. The vegetation shredder 44 includes a vegetation shredder housing 45 having a vegetation shredder interior 51. A vegetation shredder inlet opening 46 provided in the vegetation shredder housing 45 establishes communication between the hopper interior 41 of the hopper 40 and the vegetation shredder interior 51 of the vegetation shredder 44. The vegetation shredder inlet opening 46 is oppositely-disposed with respect to the guide surface 42 in the hopper interior 41 of the hopper 40. As illustrated in FIG. 4, a vegetation shredder discharge opening 47 is provided in the vegetation shredder housing 45 of the vegetation shredder 44. As illustrated in FIG. 6, in some applications a shredded vegetation receptacle 52 may be provided on the watercraft platform 4 at the vegetation shredder discharge opening 47 of the vegetation shredder 44 for purposes which will be hereinafter described.

As illustrated in FIG. 5, a rotatable vegetation shredder blade shaft 48 extends through the vegetation shredder interior 51 of the vegetation shredder 44. Multiple vegetation shredder blades 49 are provided on the vegetation shredder blade shaft 48. A vegetation shredder blade drive motor 54 (FIGS. 1-3) directly or indirectly drivingly engages the vegetation shredder blade shaft 48 through any suitable mechanical arrangement. For example, as illustrated in FIG. 3, in some embodiments the vegetation shredder blade drive motor 54 drivingly engages a motor drive shaft 55. A drive pulley 56 is provided on the motor drive shaft 55. A rotatable idle shaft 58 is disposed in spaced-apart relationship with respect to the motor drive shaft 55. The idle shaft 58 may be rotatably mounted on an idle shaft frame 60, a first idle shaft bearing 61 and a second idle shaft bearing 62 which are attached to the watercraft platform 4 of the watercraft 2 according to the knowledge of those skilled in the art.

A first idle pulley 59 is provided on the idle shaft 58. A drive belt 57 is trained around the drive pulley 56 and the first idle pulley 59. A second idle pulley 63 is also provided on the idle shaft 58. A blade shaft pulley 50 is provided on the vegetation shredder blade shaft 48. A drive belt 64 is trained around the second idle pulley 63 provided on the idle shaft 58 and the blade shaft pulley 50. Accordingly, by operation of the vegetation shredder blade drive motor 54, rotation is transmitted to the vegetation shredder blade shaft 48 through the motor drive shaft 55; the drive pulley 56; the drive belt 57; the first idle pulley 59; the idle shaft 58; the second idle pulley 63; the drive belt 64; and the blade shaft pulley 50. As further illustrated in FIG. 3, at least one battery 67 may be connected to the watercraft motor 5; the trolling motor 6; the conveyor belt motor 26 of the conveyor assembly 14; the vegetation shredder blade drive motor 54; and any other operational components of the apparatus 1. A battery support 66 may be provided on the watercraft platform 4 of the watercraft 2 to support the battery or batteries 67.

Referring next to FIGS. 8-10 of the drawings, in typical application the apparatus 1 is floated on a water body 74 on which grows waterborne vegetation 70. The waterborne vegetation 70 is typically non-native to the water body 74 on which the waterborne vegetation 70 grows and may threaten the diversity or abundance of native species, damage the ecological stability of the water body 74 and jeopardize commercial, agricultural, aquacultural and recreational activity on the water body 74, for example. The watercraft 2 is floated on the surface of the water body 74 and may be driven in a forward motion as indicated by the arrow 10 in FIGS. 8-10, typically by operation of the watercraft engine 5. The watercraft 2 is steered toward the waterborne vegetation 70 which typically floats on or near the surface of the water body 74. Simultaneously, the conveyor belt motor 26 is operated to drive the conveyor belt 34 on the conveyor assembly frame 15 of the conveyor assembly 14 in the direction indicated by the arrow 23. The vegetation shredder blade drive motor 54 is operated to rotate the vegetation shredder blades 49 in the vegetation shredder interior 51 (FIG. 5) of the vegetation shredder housing 45.

As the watercraft 2 approaches the waterborne vegetation 70, the vegetation directing panels 12 approach and then contact the waterborne vegetation 70, as illustrated in FIGS. 8 and 9, respectively. As the watercraft 2 continues to move in the forward direction 10, the vegetation directing panels 12 guide or direct the dislodged vegetation 71 against the conveyor belt 34. The carrier panels 35 on the conveyor belt 34 contact and break the waterborne vegetation 70, uprooting and dislodging the waterborne vegetation 70 from the water body 74 and lifting the resulting dislodged vegetation 71 onto the moving conveyor belt 34, as illustrated in FIG. 9.

After the dislodged vegetation 71 reaches the discharge end 19 of the conveyor assembly 14 on the conveyor belt 34, as illustrated in FIG. 10, the dislodged vegetation 71 falls into the hopper interior 41 of the hopper 40, as indicated by the arrow 38 in FIG. 5. In the hopper 40, the dislodged vegetation slides down the guide surface 42 and into the vegetation shredder interior 51 of the vegetation shredder 44 through the vegetation shredder inlet opening 46 (FIG. 5). In the vegetation shredder interior 51, the vegetation shredder blade shaft 48 rotates the vegetation shredder blades 49 which contact and shred the dislodged vegetation 71 to form shredded vegetation 72, as illustrated in FIG. 10. The shredded vegetation 72 may be discharged from the vegetation shredder interior 51 through the vegetation shredder discharge opening 47 (FIG. 4) in the shredder housing 45. In some applications, the shredded vegetation 72 may be collected in the shredded vegetation receptacle 52 (FIG. 10) and may be periodically discarded. Maneuvering of the watercraft 2 on the water body 74 continues until the waterborne vegetation 70 has been removed from the water body 74 and shredded in the manner which was heretofore described.

Figure 11:
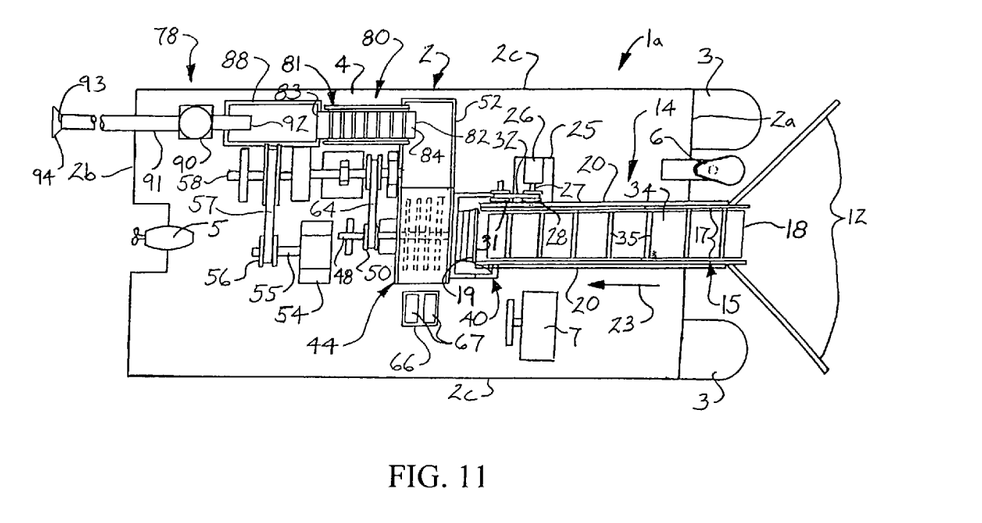
FIG. 11 is a top view of an alternative illustrative embodiment of the waterborne vegetation harvesting apparatus, with a canopy and siderail (not illustrated) removed from the apparatus for clarity, more particularly illustrating a vegetation discharge assembly fitted to the apparatus.
Figure 12:
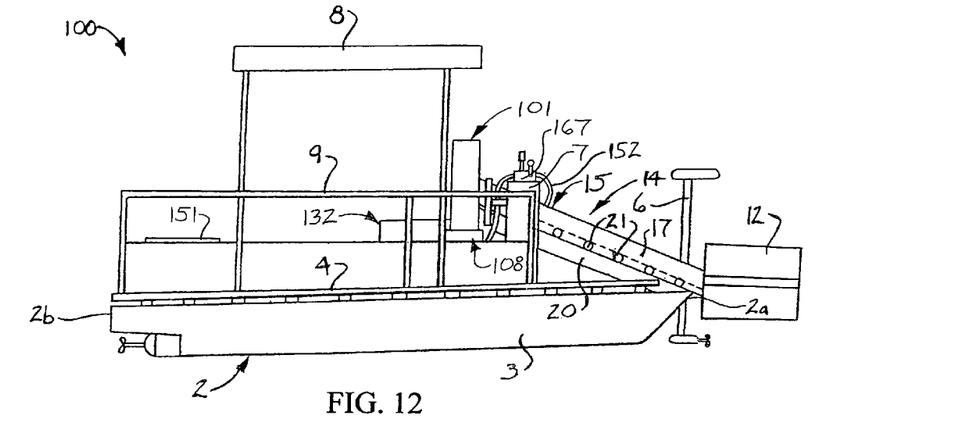
FIG. 12 is a side view of an alternative illustrative embodiment of the waterborne vegetation harvesting apparatus.
Figure 13:
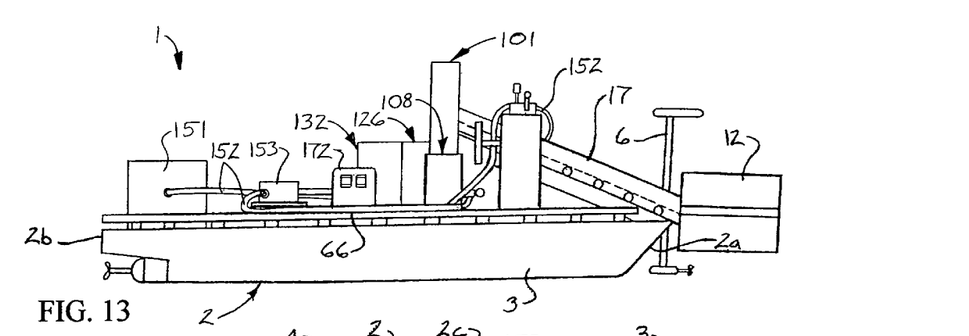
FIG. 13 is a side view of the alternative illustrative embodiment of the waterborne vegetation harvesting apparatus with a canopy, siderail and control console removed from the apparatus for clarity.

Referring next to FIG. 11 of the drawings, an alternative illustrative embodiment of the waterborne vegetation harvesting apparatus, hereinafter apparatus, is generally indicated by reference numeral 1a. The apparatus 1a includes a vegetation discharge assembly 78 which is disposed in communication with the shredded vegetation receptacle 52. The vegetation discharge assembly 78 is adapted to discharge the shredded vegetation 72 (FIG. 10) from the shredded vegetation receptacle 52 to a location which is off board the watercraft 2, such as onto a shore (not illustrated) of the water body 74 (FIGS. 8-10), for example. The vegetation discharge assembly 78 may include a conveyor assembly 80 which is provided on the watercraft platform 4 of the watercraft 2 and is adapted to convey the shredded vegetation 72 (FIG. 10) from the shredded vegetation receptacle 52. The conveyor assembly 80 may include, for example, a conveyor assembly frame 81 and multiple idle rollers (not illustrated) and a drive roller (not illustrated) which are provided on the conveyor assembly frame 81. A belt drive motor (not illustrated) drivingly engages the drive roller. A conveyor belt 84 is disposed for movement on the idle rollers responsive to rotation of the drive roller by operation of the belt drive motor. A loading end 82 of the conveyor assembly 80 is disposed in communication with the shredded vegetation receptacle 52. A discharge end 83 of the conveyor assembly 80 is disposed in communication with a shredded vegetation storage container 88 which is provided on the watercraft platform 4.

A vacuum pump 90 is provided on the watercraft platform 4 and communicates with a vacuum conduit 91, at least a portion of which may be flexible. An intake end 92 of the vacuum conduit 91 communicates with the shredded vegetation storage container 88. A discharge end 93 of the vacuum conduit 91 is adapted for positioning at a location which is off-board the watercraft 2. A discharge nozzle 94 may be provided on the discharge end 93 of the vacuum conduit 91.

In typical operation of the vegetation discharge assembly 78 of the waterborne vegetation harvesting apparatus 1a, the conveyor assembly 80 is operated to transport the shredded vegetation 72 (FIG. 10) from the shredded vegetation receptacle 52 to the shredded vegetation storage container 88. The vacuum pump 80 may be operated to draw the shredded vegetation from the shredded vegetation storage container 88 through the vacuum conduit 91 and discharge the shredded vegetation to a location which is remote from the watercraft 2, such as onto the shore (not illustrated) of the water body 74 (FIG. 10), for example.

Figure 14:
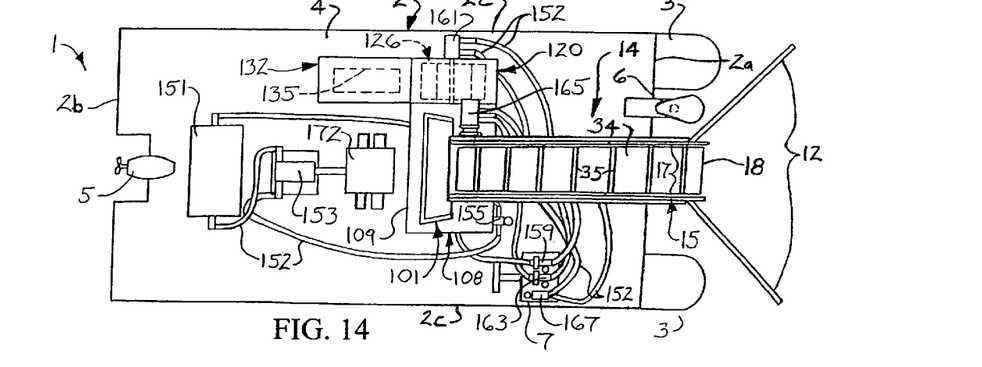
FIG. 14 is a top view of the alternative illustrative embodiment of the waterborne vegetation harvesting apparatus, with the canopy and siderail removed from the apparatus for clarity.
Figure 15:
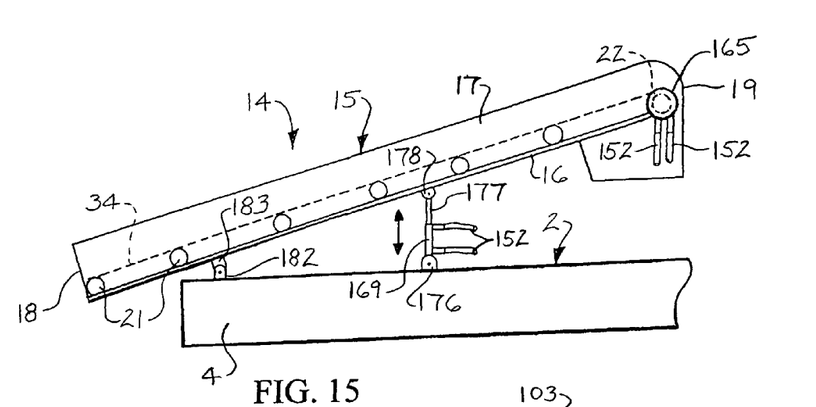
FIG. 15 is a side view of a conveyor assembly of the alternative illustrative embodiment of the waterborne vegetation harvesting apparatus, more particularly illustrating an elevation cylinder and piston engaging the conveyor assembly for selectively raising and lowering the conveyor assembly.
Figure 16:
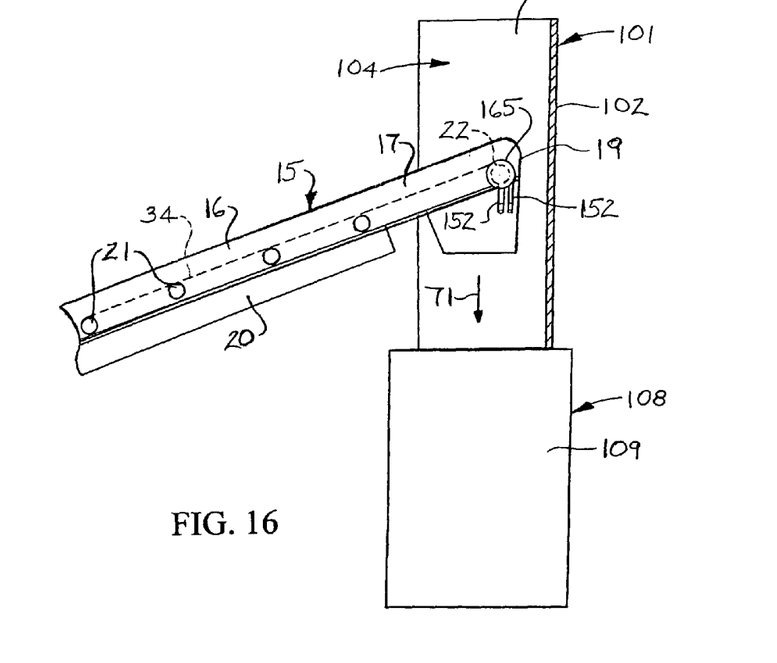
FIG. 16 is a side view, partially in section, of the conveyor assembly of the alternative illustrative embodiment of the waterborne vegetation harvesting apparatus, more particularly illustrating discharge of dislodged vegetation from the conveyor assembly and through a hopper (in section) into a primary vegetation shredder.

Referring next to FIGS. 12-18 and 23 of the drawings, an alternative illustrative embodiment of the apparatus is generally indicated by reference numeral 100. A primary vegetation shredder 108 is provided on the watercraft platform 4 of the watercraft 2 generally beneath the discharge end 19 of the conveyor assembly 14, as particularly illustrated in FIG. 16. In some embodiments, a hopper 101 may be provided on the primary vegetation shredder 108. As illustrated in FIG. 16, the hopper 101 may generally include a hopper rear portion 102 and a pair of spaced-apart hopper side portions 103 (one of which is illustrated) which extend from the hopper rear portion 102. The hopper rear portion 102 and the hopper side portions 103 define a hopper interior 104. The discharge end 19 of the conveyor assembly 14 may be disposed within the hopper interior 104. As illustrated in FIGS. 15 and 16, in some embodiments a conveyor belt motor 165, which may be hydraulic, may be provided on the conveyor assembly frame 15 of the conveyor assembly 14 and drivingly engage the drive roller 22 of the conveyor assembly 14.

As illustrated in FIG. 15, in some embodiments the discharge end 19 of the conveyor assembly 14 may be vertically adjustable within the hopper interior 104 (FIG. 16) of the hopper 101. The conveyor assembly 14 may be actuated for vertical adjustment according to any suitable technique which is known by those skilled in the art. In some embodiments, conveyor assembly attachment flanges 182 may be provided on the watercraft platform 4 of the watercraft 2. Conveyor assembly pivot flanges 183 provided on the conveyor assembly frame 15 of the conveyor assembly 14 may be pivotally attached to the conveyor assembly attachment flanges 182. An elevation cylinder 169, which may be hydraulic, may be attached to the watercraft platform 4 via cylinder mount flanges 176. A piston 177 may be selectively extendable from the elevation cylinder 169 and may be pivotally attached to the conveyor assembly frame 15 of the conveyor assembly 14 via piston attachment flanges 178. Accordingly, the piston 177 may be selectively extended from and retracted into the elevation cylinder 169 to facilitate selective raising and lowering, respectively, of the conveyor assembly 14 with respect to the watercraft platform 4.

Figure 17:
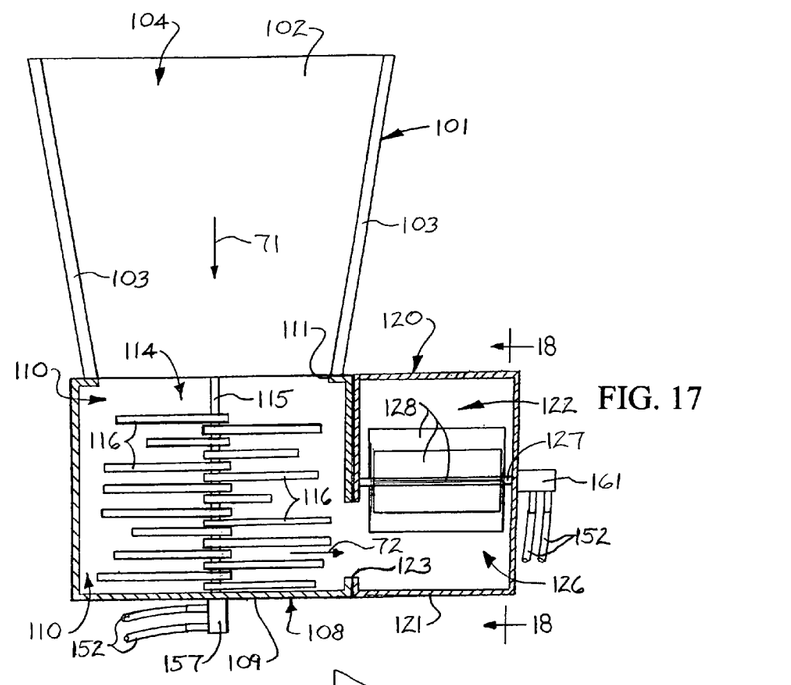
FIG. 17 are sectional views of a primary vegetation shredder and a secondary vegetation shredder of the alternative illustrative embodiment of the waterborne vegetation harvesting apparatus.

As illustrated in FIG. 17, the primary vegetation shredder 108 may include a primary vegetation shredder housing 109 having a primary vegetation shredder interior 110. The primary vegetation shredder interior 110 may communicate with the hopper interior 104 of the hopper 101 through a primary vegetation shredder inlet opening 111. A primary vegetation shredder blade assembly 114 is provided in the primary vegetation shredder interior 110 of the primary vegetation shredder housing 109. The primary vegetation shredder blade assembly 114 may include a shredder blade shaft 115 which in some embodiments may be disposed in a generally vertical orientation inside the primary vegetation shredder interior 110. Multiple vegetation shredder blades 116 may extend outwardly in a generally horizontal orientation from the shredder blade shaft 115. A primary vegetation shredder motor 157 drivingly engages the shredder blade shaft 115. In some embodiments the primary vegetation shredder motor 157 may be hydraulic, as will be hereinafter described. The primary vegetation shredder motor 157 may be adapted to rotate the shredder blade shaft 115 of the primary vegetation shredder blade assembly 114 in the clockwise direction.

As illustrated in FIG. 14, in some embodiments, a secondary vegetation shredder 120 may be provided on the watercraft platform 4 of the watercraft 2 in generally adjacent relationship with respect to the primary vegetation shredder 108. As illustrated in FIG. 17, the secondary vegetation shredder 120 may include a secondary vegetation shredder housing 121 having a secondary vegetation shredder interior 122. The secondary vegetation shredder interior 122 of the secondary vegetation shredder housing 121 may communicate with the primary vegetation shredder interior 110 of the primary vegetation shredder 108 through a secondary vegetation shredder inlet opening 123.

Figure 18:
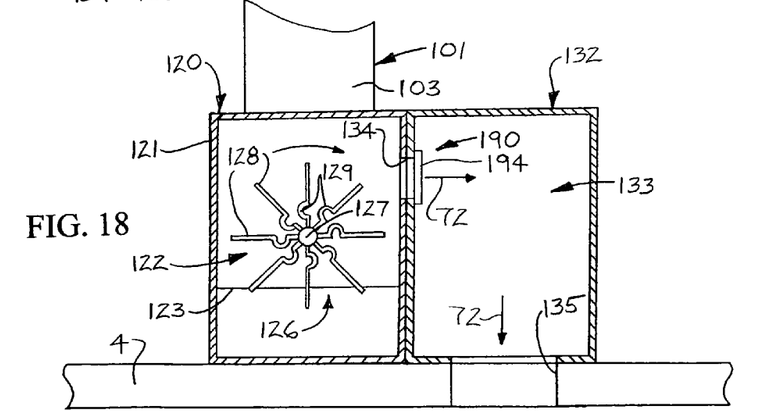
FIG. 18 is a sectional view, taken along section liens 18-18 in FIG. 17, of a secondary vegetation shredder and a shredded vegetation receptacle of the alternative illustrative embodiment of the waterborne vegetation harvesting apparatus.

A secondary vegetation shredder blade assembly 126 is provided in the secondary interior 122 of the secondary vegetation shredder housing 121. The secondary vegetation shredder blade assembly 126 includes a shredder blade shaft 127 which in some embodiments may be disposed in a generally horizontal orientation in the secondary vegetation shredder interior 122. A longitudinal axis of the shredder blade shaft 127 of the secondary vegetation shredder blade assembly 126 may be disposed in generally perpendicular relationship with respect to a longitudinal axis of the shredder blade shaft 115 of the primary shoulder blade assembly 114. As illustrated in FIG. 18, multiple vegetation shredder plates 128 may extend outwardly from the shredder blade shaft 127 in spaced-apart relationship with respect to each other. A plate curve 129 may be formed in each shredder plate 128 for purposes which will be hereinafter described. A secondary vegetation shredder motor 161 (FIG. 17) drivingly engages the shredder blade shaft 127. In some embodiments the secondary vegetation shredder motor 161 may be hydraulic, as will be hereinafter described. As illustrated in FIG. 18, the secondary vegetation shredder motor 161 may be adapted to rotate the shredder blade shaft 127 of the secondary vegetation shredder blade assembly 126 in the clockwise direction as the secondary vegetation shredder 120 is viewed toward the hopper 101.

As further illustrated in FIG. 14, in some embodiments a shredded vegetation receptacle 132 may be provided on the watercraft platform 4 of the watercraft 2 in generally adjacent relationship with respect to the secondary vegetation shredder 120. As illustrated in FIG. 18, the shredded vegetation receptacle 132 has a vegetation receptacle interior 133 which may be disposed in fluid communication with the secondary vegetation shredder interior 122 of the secondary vegetation shredder 120 through a receptacle inlet opening 134. A discharge opening 135 may be provided in the bottom of the shredded vegetation receptacle 132 and extend through the watercraft platform 4 of the watercraft 2 for purposes which will be hereinafter described.

Figure 23:
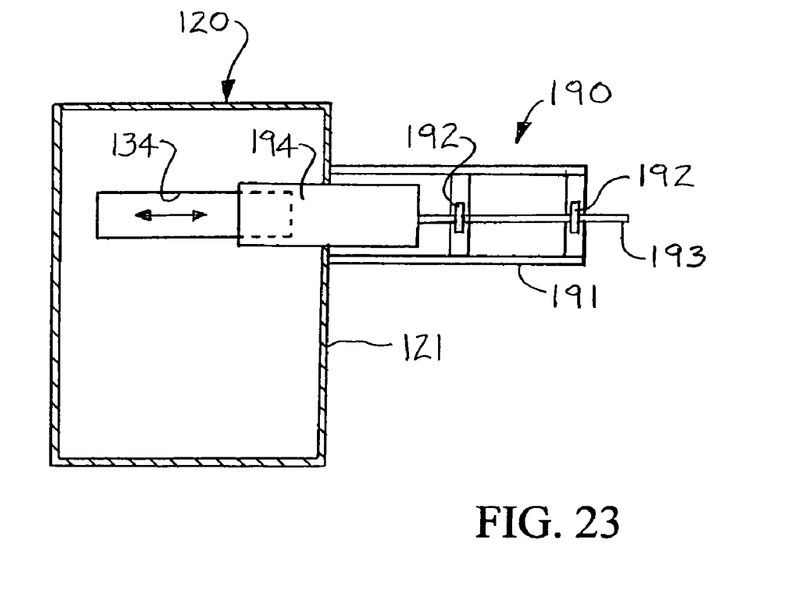
FIG. 23 is a front view of an exemplary gate assembly which facilitates control in the size of a receptacle inlet opening between the secondary vegetation shredder and the shredded vegetation receptacle.

As illustrated in FIG. 23, in some embodiments the secondary vegetation shredder 120 may be fitted with a gate assembly 190 the purpose of which will be hereinafter described. In some embodiments, the gate assembly 190 may include a gate assembly frame 191 which may extend from an exterior surface of the secondary vegetation shredder housing 121 of the secondary vegetation shredder 120. A pair of spaced-apart shaft nuts 192 may be provided on the gate assembly frame 191. An elongated gate shaft 193 may threadably engage the shaft nuts 192. A gate panel 194 may be provided on the gate shaft 193. Accordingly, the responsive to threading of the gate shaft 193 in the shaft nuts 192, the gate shaft 193 is adapted to advance to the left and right in FIG. 23 such that the gate panel 194 covers or blocks and uncovers or unblocks, respectively, a selected area of the receptacle inlet opening 134 which establishes communication between the secondary vegetation shredder interior 122 (FIG. 18) of the secondary vegetation shredder 120 and the vegetation receptacle interior 133 of the shredded vegetation receptacle 132.

Figure 21:
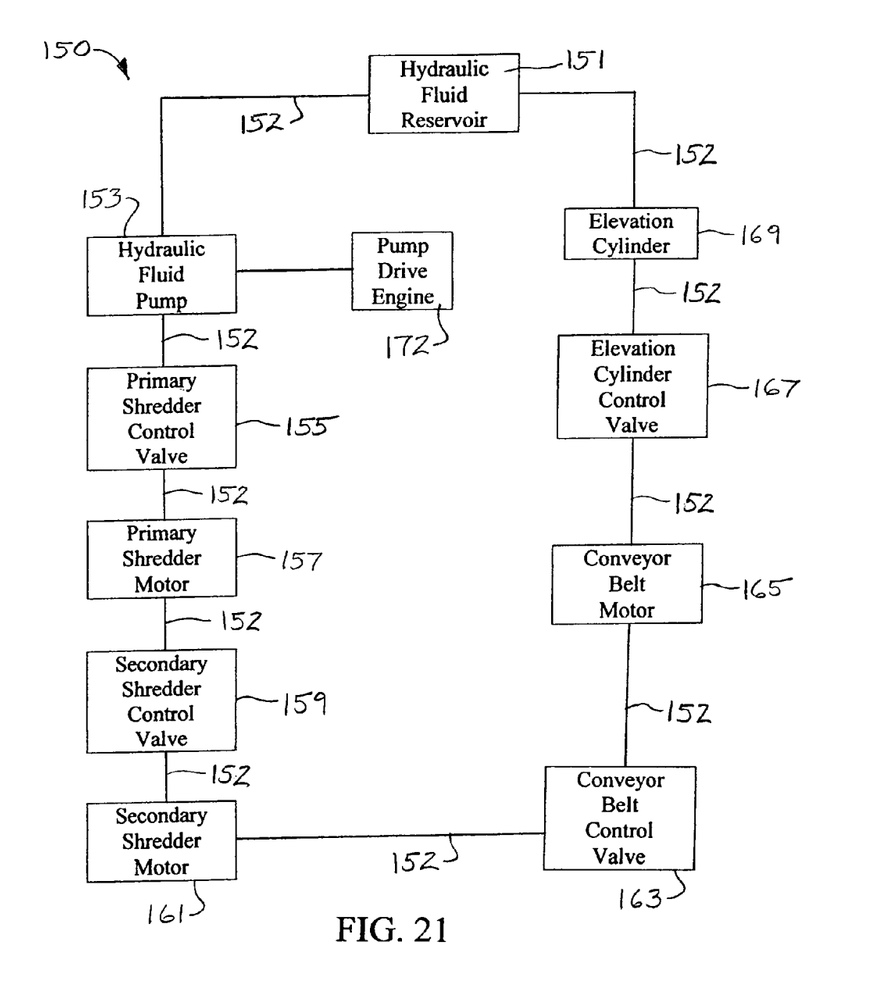
FIG. 21 is a block diagram of a hydraulic system of an alternative illustrative embodiment of the waterborne vegetation harvesting apparatus.

As illustrated in FIGS. 14 and 21, in some embodiments the primary vegetation shredder motor 157, the secondary vegetation shredder motor 161, the conveyor belt motor 165 and the elevation cylinder 169 may be component parts of a hydraulic system 150. The hydraulic system 150 includes a hydraulic fluid reservoir 151 which may be provided on the watercraft platform 4 of the watercraft 2, as illustrated in FIG. 14. A hydraulic fluid pump 153 is disposed in fluid communication with the hydraulic fluid reservoir 151 through a hydraulic conduit 152. A pump drive engine 172 drivingly engages the hydraulic fluid pump 153.

A primary vegetation shredder control valve 155 is connected to the hydraulic fluid pump 153 through a hydraulic conduit 152. As illustrated in FIG. 14, in some embodiments the primary vegetation shredder control valve 155 may be provided on the primary vegetation shredder housing 109 of the primary vegetation shredder 108. The primary vegetation shredder motor 157 of the primary vegetation shredder blade assembly 114 (FIG. 17) is connected to the primary vegetation shredder control valve 155 through a hydraulic conduit 152. Accordingly, the primary vegetation shredder control valve 155 facilitates operation of the primary vegetation shredder motor 157 by controlling flow of hydraulic fluid from the hydraulic fluid pump 153 to the primary vegetation shredder motor 157.

A secondary vegetation shredder control valve 159 is connected to the primary vegetation shredder motor 157 through a hydraulic conduit 152. As illustrated in FIG. 14, the secondary vegetation shredder control valve 159 may be provided on the control console 7. The secondary vegetation shredder motor 161 of the secondary vegetation shredder blade assembly 126 (FIG. 17) is connected to the secondary vegetation shredder control valve 159 through a hydraulic conduit 152. Accordingly, the secondary vegetation shredder control valve 159 facilitates operation of the secondary vegetation shredder motor 161 by controlling flow of hydraulic fluid from the hydraulic fluid pump 153 to the secondary vegetation shredder motor 161.

A conveyor belt control valve 163 is connected to the secondary vegetation shredder motor 161 through a hydraulic conduit 152. As illustrated in FIG. 14, the conveyor belt control valve 163 may be provided on the control console 7. The conveyor belt motor 165 (FIGS. 15 and 16) which drivingly engages the conveyor belt 34 of the conveyor assembly 14 is connected to the conveyor belt control valve 163 through a hydraulic conduit 152. Accordingly, the conveyor belt control valve 163 facilitates operation of the conveyor belt motor 165 by controlling flow of hydraulic fluid from the hydraulic fluid pump 153 to the conveyor belt motor 165.

An elevation cylinder control valve 167 is connected to the conveyor belt motor 165 through a hydraulic conduit 152. As illustrated in FIG. 14, in some embodiments the elevation cylinder control valve 167 may be provided on the control console 7. The elevation cylinder 169 which facilitates selective vertical positional adjustment of the conveyor assembly 14 as was heretofore described with respect to FIG. 15 is connected to the elevation cylinder control valve 167 through a hydraulic conduit 152. The hydraulic fluid reservoir 151 is connected to the elevation cylinder 169 through a hydraulic conduit 152. Accordingly, the elevation cylinder control valve 167 facilitates operation of the elevation cylinder 169 by controlling flow of hydraulic fluid from the hydraulic fluid pump 153 to the elevation cylinder 169. Hydraulic fluid returns to the hydraulic fluid reservoir 151 from the elevation cylinder 169 through the hydraulic conduit 152.

Figure 22:
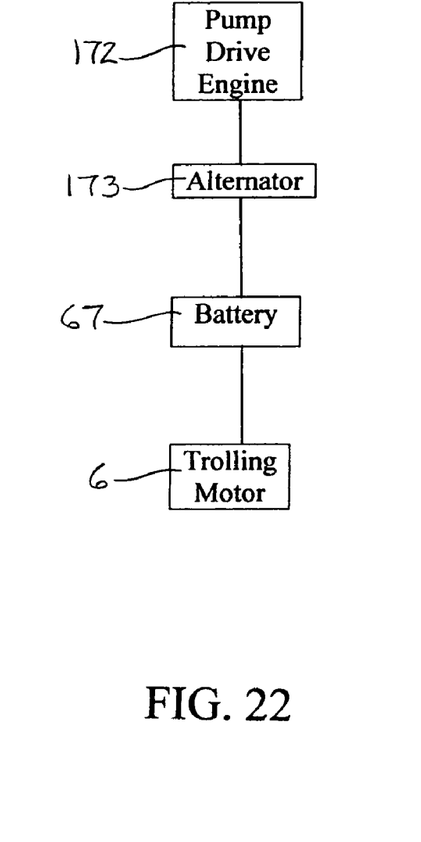
FIG. 22 is a block diagram which illustrates an alternator coupled to a pump drive engine, a battery connected to the alternator and a trolling motor connected to the battery according to an illustrative embodiment of the waterborne vegetation harvesting apparatus.

Referring next to FIG. 22, in some embodiments an alternator 173 may be drivingly engaged by the pump drive engine 172. A battery 67 to which the trolling motor 6 (FIGS. 12-14) is connected may be electrically connected to the alternator 173. Accordingly, the alternator 173, driven by the pump drive engine 172, continually replenishes the supply of electrical power which is stored in the battery 67 to ensure operation of the trolling motor 6 when necessary.

Typical application of the apparatus 100 may be as was heretofore described with respect to the apparatus 1 in FIGS. 1-11. As the watercraft 2 of the apparatus 100 is floated on a water body 74 (FIGS. 8-10) in a forward motion typically by operation of the watercraft engine 5, the conveyor belt motor 165 is operated to drive the conveyor belt 34 upwardly and forwardly on the conveyor assembly frame 15 of the conveyor assembly 14. The primary vegetation shredder motor 157 is operated to rotate the vegetation shredder blades 116 in the primary vegetation shredder interior 110 (FIG. 17) of the primary vegetation shredder housing 109. Simultaneously, the secondary vegetation shredder motor 161 may be operated to rotate the vegetation shredder plates 128 (FIG. 18) in the secondary vegetation shredder interior 122 of the secondary vegetation shredder housing 121.

As the watercraft 2 approaches the waterborne vegetation 70 (FIGS. 1-10), the vegetation directing panels 12 approach and then contact the waterborne vegetation 70, as was heretofore described with respect to FIGS. 8 and 9, respectively. As the watercraft 2 continues to move in the forward direction 10, the vegetation directing panels 12 guide or direct the dislodged vegetation 71 against the conveyor belt 34. The carrier panels 35 on the conveyor belt 34 contact and break the waterborne vegetation 70, uprooting and dislodging the waterborne vegetation 70 from the water body 74 and lifting the resulting dislodged vegetation 71 onto the moving conveyor belt 34, as illustrated in FIG. 9. It will be appreciated by those skilled in the art that the slope of the conveyor assembly 14 can be selectively adjusted as deemed necessary by operation of the elevation cylinder 169 (FIG. 15) via the elevation cylinder control valve 167 (FIG. 21).

After the dislodged vegetation 71 reaches the discharge end 19 of the conveyor assembly 14 on the conveyor belt 34, as illustrated in FIG. 10, the dislodged vegetation 71 falls into the hopper interior 104 (FIG. 17) of the hopper 101. The dislodged vegetation 71 falls from the hopper interior 104 into the primary vegetation shredder interior 110 of the primary vegetation shredder 108 through the primary vegetation shredder inlet opening 111 (FIG. 17). In the primary vegetation shredder interior 110, the shredder blade shaft 115, driven by the primary shredder motor 157, rotates the vegetation shredder blades 116 which contact and shred the dislodged vegetation 71 to form shredded vegetation 72, as illustrated in FIG. 17. Simultaneously, the shredder blade shaft 127, driven by the secondary shredder motor 161, rotates the vegetation shredder plates 146 of the tertiary shredder blade assembly 144. The typically clockwise rotation of the vegetation shredder blades 116 may discharge the shredded vegetation 72 from the primary shredder interior 110 into the secondary shredder interior 122 through the secondary shredder inlet opening 123 (FIG. 17). Additionally, the plate curve 147 (FIG. 18) which may be provided in each shredder blade 146 may enhance flow of air and shredded vegetation 72 from the primary shredder interior 110 of the primary vegetation shredder 108 through the secondary shredder inlet opening 123 and into the secondary shredder interior 122 of the secondary vegetation shredder 120. In the secondary shredder interior 122, the shredded vegetation 72 may be further shredded by the rotating shredder plates 128 of the secondary shredder blade assembly 126. The shredder plates 128 may discharge the further shredded vegetation 72 from the secondary shredder interior 122 into the vegetation receptacle interior 133 (FIG. 18) of the shredded vegetation receptacle 132 through the receptacle inlet opening 134.

Under circumstances in which the dislodged vegetation 71 is particularly heavy and further shredding of the shredded vegetation 72 is necessary, the gate panel 194 (FIG. 18) of the gate assembly 190 (which was heretofore described with respect to FIG. 23) may be selectively positioned to completely or partially close the receptacle inlet opening 134 to block or impede entry of the shredded vegetation 72 into the shredded vegetation receptacle 132 and increase shredding of the shredded vegetation 72 in the secondary vegetation shredder 120. The gate panel 194 of the gate assembly 190 may subsequently be repositioned to open the receptacle inlet opening 134 and facilitate unimpeded flow of the additionally shredded vegetation 72 from the secondary vegetation shredder 120 into the shredded vegetation receptacle 132. As further illustrated in FIG. 18, the shredded vegetation 72 may be discharged from the vegetation receptacle interior 133 of the shredded vegetation receptacle 132 through the discharge opening 135.

Figure 19:
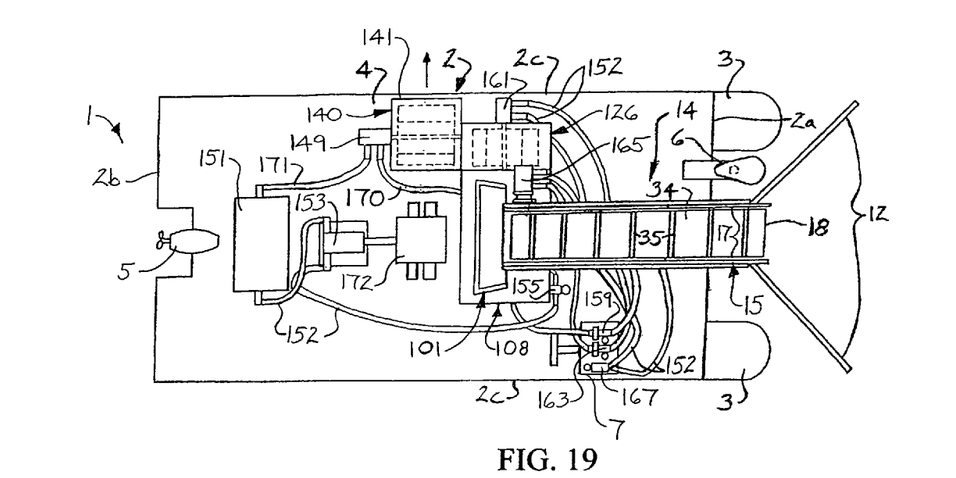
FIG. 19 is a top view of another alternative illustrative embodiment of the waterborne vegetation harvesting apparatus in which the shredded vegetation receptacle is replaced by a tertiary shredder, with the canopy and siderail removed from the apparatus for clarity.
Figure 20:
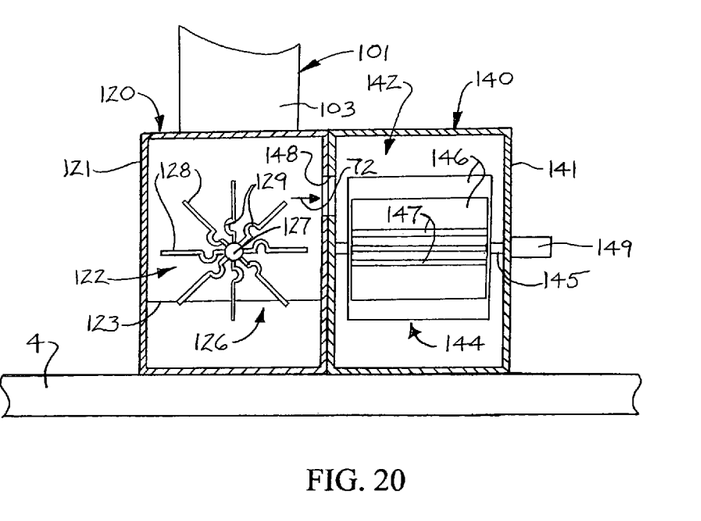
FIG. 20 is an alternative sectional view, taken along section lines 18-18 in FIG. 17, of a secondary vegetation shredder and a tertiary shredder of the alternative illustrative embodiment of the waterborne vegetation harvesting apparatus illustrated in FIG. 19.

Referring next to FIGS. 19 and 20 of the drawings, in some embodiments of the apparatus 100, the shredded vegetation receptacle 132 (FIG. 14) may be replaced by a tertiary shredder 140 to additionally shred the shredded vegetation 72 as deemed necessary. As illustrated in FIG. 20, the tertiary shredder 140 may include tertiary shredder housing 141 having a tertiary shredder interior 142 which is disposed in communication with the secondary shredder interior 122 of the secondary vegetation shredder 120 through a tertiary shredder inlet opening 148. A tertiary shredder blade assembly 144 is provided in the tertiary shredder interior 142. The tertiary shredder blade assembly 144 may include a shredder blade shaft 145 which is drivingly engaged by a tertiary shredder motor 149. Multiple spaced-apart shredder plates 146 may extend outwardly from the shredder blade shaft 145. A plate curve 147 may be provided in each shredder blade 146 to enhance flow of air and shredded vegetation 72 from the secondary shredder interior 122 of the secondary vegetation shredder 120 through the tertiary shredder inlet opening 148 and into the tertiary shredder interior 142 of the tertiary shredder 140. The shredder plates 146 of the tertiary shredder blade assembly 144 may be oriented such that additionally shredded vegetation 72 may be discharged from the tertiary shredder interior 142 of the tertiary shredder 140 through an outlet opening (not illustrated) provided in the side of the tertiary shredder housing 141 which faces the water body 74 (FIGS. 8-10) such that the shredded vegetation 72 is discharged onto the water body 74.

In some embodiments, the tertiary shredder motor 149 may be hydraulic. Accordingly, as illustrated in FIG. 19, the hydraulic conduit 152 which normally connects the outlet of the elevation cylinder 169 (FIG. 15) to the hydraulic fluid reservoir 151 (as illustrated in FIG. 14) may be rerouted to an inlet of the tertiary shredder motor 149. An outlet of the tertiary shredder motor 149 may be connected to the hydraulic fluid reservoir 151 through a separate hydraulic conduit 152.

It will be appreciated by those skilled in the art that the waterborne vegetation harvesting apparatus is environmentally-friendly since its operation does not require the use of chemicals. The vegetation which is harvested from the water bodies is shredded and does not require additional steps to prevent spread of the vegetation after harvesting. The shredded vegetation can be safely discharged back into the water body from which it was harvested without risk of additional growth and spread of the vegetation.

While the preferred embodiments of the invention have been described above, it will be recognized and understood that various modifications can be made in the invention and the appended claims are intended to cover all such modifications which may fall within the spirit and scope of the invention.

What is claimed is:

1. A waterborne vegetation harvesting apparatus, comprising:
    a watercraft;
    a conveyor assembly having a conveyor belt carried by said watercraft;
    a primary vegetation shredder disposed in communication with said conveyor assembly and having a generally vertical primary shredder blade shaft and a plurality of generally horizontal primary shredder blades spaced-apart along and drivingly engaged by said primary shredder blade shaft;
    a primary shredder motor drivingly engaging said primary shredder blade shaft;
    a secondary vegetation shredder disposed in communication with said primary vegetation shredder and having a generally horizontal secondary shredder blade shaft and a plurality of elongated secondary shredder plates circumferentially spaced-apart along and parallel to said secondary shredder blade shaft;
    a secondary shredder motor drivingly engaging said secondary shredder blade shaft;
    a tertiary vegetation shredder disposed in communication with said secondary vegetation shredder and having a generally horizontal tertiary shredder blade shaft oriented in generally perpendicular relationship to said secondary shredder blade shaft of said secondary vegetation shredder and a plurality of elongated tertiary shredder plates circumferentially spaced-apart along and parallel to said tertiary shredder blade shaft; and
    a tertiary shredder motor drivingly engaging said tertiary shredder blade shaft.

2. The apparatus of claim 1 further comprising a pair of vegetation directing panels carried by said watercraft on respective sides of said conveyor assembly.

3. The apparatus of claim 1 wherein said conveyor assembly comprises a conveyor assembly frame, a plurality of idle rollers and a drive roller carried by said conveyor assembly frame, a conveyor belt carried by said idle rollers and said drive toiler and a conveyor belt motor drivingly engaging said drive roller.

4. The apparatus of claim 3 wherein said conveyor assembly frame comprises a frame panel carried by said watercraft and a pair of spaced-apart frame sidewalls carried by said frame panel, and wherein said conveyor belt motor is carried by one of said frame sidewalls.

5. The apparatus of claim 1 further comprising a hopper disposed adjacent to said conveyor belt of said conveyor assembly and wherein said primary vegetation shredder comprises a shredder housing having a shredder interior communicating with said hopper, a and wherein said primary shredder blade shaft is provided in said shredder interior.

6. The apparatus of claim 1 wherein said watercraft comprises a plurality of flotation tanks and a watercraft platform carried by said plurality of flotation tanks, and wherein said conveyor assembly and said primary vegetation shredder, said secondary vegetation shredder and said tertiary vegetation shredder are carried by said watercraft platform.

7. The apparatus of claim 6 further comprising a canopy carried by said watercraft platform.

8. A waterborne vegetation harvesting apparatus, comprising:
  a watercraft;
  a conveyor assembly having a conveyor belt carried by said watercraft, a conveyor belt motor drivingly engaging said conveyor belt and a loading end and a discharge end spaced-apart from said loading end;
  a primary vegetation shredder comprising:
    a primary shredder housing having a primary shredder interior disposed in communication with said discharge end of said conveyor assembly;
    a primary shredder blade assembly having a generally vertical primary shredder blade shaft provided in said primary shredder interior and a plurality of generally horizontal primary shredder blades spaced-apart along and drivingly engaged by said primary shredder blade shaft; and
    a primary shredder motor drivingly engaging said primary shredder blade shaft of said primary shredder blade assembly;
  a secondary vegetation shredder comprising:
    a secondary shredder housing having a secondary shredder interior disposed in communication with said primary shredder interior of said primary shredder housing;
    a second secondary shredder blade assembly having a generally horizontal secondary shredder blade shall provided in said secondary shredder interior and a plurality of elongated secondary shredder plates circumferentially spaced-apart along and parallel to said secondary shredder blade shaft;
    a secondary shredder motor drivingly engaging said secondary shredder blade shaft of said secondary shredder blade assembly; and
  a tertiary vegetation shredder comprising:
    a tertiary shredder housing having a tertiary shredder interior disposed in communication with said secondary shredder interior of said secondary shredder housing;
    a generally horizontal tertiary shredder blade shaft in said tertiary shredder interior and oriented in generally perpendicular relationship to said secondary shredder blade shaft of said secondary vegetation shredder and a plurality of elongated tertiary shredder plates circumferentially spaced-apart along and parallel to said tertiary shredder blade shaft; and
    a tertiary shredder motor drivingly engaging said tertiary shredder blade shaft.

9. The apparatus of claim 8 wherein said secondary shredder blade shaft of said secondary shredder blade assembly is disposed in generally perpendicular relationship with respect to said primary shredder blade shaft of said primary shredder blade assembly.

10. The apparatus of claim 8 further comprising a plurality of plate curves provided in said plurality of secondary shredder plates, respectively, of said secondary shredder blade assembly.

11. The apparatus of claim 8 wherein said conveyor assembly is pivotally carried by said watercraft and further comprising an elevation cylinder carried by said watercraft and a piston extendable from said elevation cylinder and engaging said conveyor assembly.

12. The apparatus of claim 11 further comprising a hydraulic fluid reservoir carried by said watercraft, a hydraulic fluid pump disposed in fluid communication with said hydraulic fluid reservoir and a pump drive engine drivingly engaging said hydraulic fluid pump; and wherein each of said conveyor belt motor, said first shredder motor, said second shredder motor and said elevation cylinder is disposed in fluid communication with said hydraulic fluid pump.

13. The apparatus of claim 8 further comprising a shredded vegetation receptacle having a vegetation receptacle interior disposed in fluid communication with said secondary shredder interior of said secondary vegetation shredder and a discharge opening provided in said shredded vegetation receptacle.

14. The apparatus of claim 13 further comprising a gate assembly disposed between said secondary shredder interior of said secondary vegetation shredder and said vegetation receptacle interior of said shredded vegetation receptacle.

15. A waterborne vegetation harvesting apparatus, comprising:
  a watercraft;
  a conveyor assembly having a conveyor belt pivotally carried by said watercraft, a conveyor belt motor having a conveyor belt control valve drivingly engaging said conveyor belt and a loading end and a discharge end spaced-apart from said loading end;
  an elevation cylinder having an elevation cylinder control valve carried by said watercraft and a piston extendable from said elevation cylinder and engaging said conveyor assembly;
  a primary vegetation shredder comprising:
    a primary shredder housing having a primary shredder interior disposed in communication with said discharge end of said conveyor assembly;
    a primary shredder blade assembly having a generally vertical primary shredder blade shaft provided in said primary shredder interior and a plurality of generally horizontal primary shredder blades spaced-apart along and drivingly engaged by said primary shredder blade shaft; and
    a primary shredder motor drivingly engaging said primary shredder blade shaft of said primary shredder blade assembly and having a primary shredder control valve;
  a secondary vegetation shredder comprising:
    a secondary shredder housing having a secondary shredder interior disposed in communication with said primary shredder interior of said primary shredder housing;
    a secondary shredder blade assembly having a generally horizontal secondary shredder blade shaft provided in said secondary shredder interior, a plurality of generally elongated secondary shredder plates circumferentially spaced-apart along and parallel to said secondary shredder blade shaft and a plurality of plate curves provided in said plurality of secondary shredder plates, respectively; and
    a secondary shredder motor drivingly engaging said secondary shredder blade shaft of said secondary shredder blade assembly and having a secondary shredder control valve;
  a tertiary vegetation shredder comprising:
    a tertiary shredder housing having a tertiary shredder interior disposed in communication with said secondary shredder interior of said secondary shredder housing;
    a generally horizontal tertiary shredder blade shaft in said tertiary shredder interior and oriented in generally perpendicular relationship to said secondary shredder blade shaft of said secondary vegetation, shredder and, a plurality of generally elongated tertiary shredder plates circumferentially spaced-apart along and parallel to said tertiary shredder blade shaft; and a tertiary shredder motor drivingly engaging said tertiary shredder blade shaft;

a hydraulic fluid reservoir carried by said watercraft;

a hydraulic fluid pump disposed in fluid communication with said hydraulic fluid reservoir and said conveyor belt motor, said conveyor belt control valve, said primary shredder motor, said primary shredder control valve, said secondary shredder motor, said secondary shredder control valve, said elevation cylinder and said elevation cylinder control valve; and a pump drive engine drivingly engaging said hydraulic fluid pump.

16. The apparatus of claim 15 wherein said secondary shredder blade shaft of said secondary shredder blade assembly is disposed in generally perpendicular relationship with respect to said primary shredder blade shaft of said primary shredder blade assembly.

* * * * *